(12) United States Patent
Jung et al.

(10) Patent No.: US 12,480,180 B2
(45) Date of Patent: Nov. 25, 2025

(54) METHOD OF EXTRACTING LITHIUM FROM LITHIUM-CONTAINING SOLUTION

(71) Applicant: RESEARCH INSTITUTE OF INDUSTRIAL SCIENCE & TECHNOLOGY, Pohang-si (KR)

(72) Inventors: Woo Chul Jung, Pohang-si (KR); Woonkyoung Park, Pohang-si (KR); Kiyoung Kim, Pohang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 717 days.

(21) Appl. No.: 17/786,627

(22) PCT Filed: Dec. 18, 2020

(86) PCT No.: PCT/KR2020/018660
§ 371 (c)(1),
(2) Date: Jun. 17, 2022

(87) PCT Pub. No.: WO2021/125879
PCT Pub. Date: Jun. 24, 2021

(65) Prior Publication Data
US 2023/0038391 A1  Feb. 9, 2023

(30) Foreign Application Priority Data
Dec. 20, 2019  (KR) .................. 10-2019-0172463

(51) Int. Cl.
*C22B 26/12*  (2006.01)
*C02F 1/02*  (2023.01)
(Continued)

(52) U.S. Cl.
CPC .............. *C22B 26/12* (2013.01); *C02F 1/02* (2013.01); *C02F 1/28* (2013.01); *C02F 1/52* (2013.01); *C22B 3/00* (2013.01)

(58) Field of Classification Search
None
See application file for complete search history.

(56) References Cited

U.S. PATENT DOCUMENTS 4,980,136 A  * 12/1990  Brown .................. C01B 35/109
                                                423/179.5
10,167,531 B2 *  1/2019  Sharma ..................... C22B 3/44
(Continued)

FOREIGN PATENT DOCUMENTS

JP   2001-503367    3/2001
JP   2013-193940    9/2013
(Continued)

OTHER PUBLICATIONS

English translation of RU-2656452-C2 Description. (Year: 2018).*
(Continued)

*Primary Examiner* — Anthony J Zimmer
*Assistant Examiner* — Zachary John Baum
(74) *Attorney, Agent, or Firm* — LEX IP MEISTER, PLLC

(57) ABSTRACT

A method of extracting lithium from a lithium-containing solution according to an exemplary embodiment of the present invention includes: obtaining a lithium chloride solution from the lithium-containing solution; and crystallizing and removing sodium chloride in the obtained lithium chloride solution.

11 Claims, 2 Drawing Sheets

(51) Int. Cl.
  *C02F 1/28* (2023.01)
  *C02F 1/52* (2023.01)
  *C22B 3/00* (2006.01)

(56) References Cited

U.S. PATENT DOCUMENTS

2015/0071837 A1* 3/2015 Chon .................... C01D 15/02
  423/641
2015/0353484 A1* 12/2015 Yi .......................... C07C 303/02
  562/101

FOREIGN PATENT DOCUMENTS

| JP | 2014-173144 | 9/2014 |
| KR | 10-1047984 | 7/2011 |
| KR | 10-2013-0113287 | 10/2013 |
| KR | 10-1319594 | 10/2013 |
| KR | 10-2014-0144380 | 12/2014 |
| KR | 10-2016-0129657 | 11/2016 |
| KR | 10-2017-0078617 | 7/2017 |
| KR | 10-1898236 | 10/2018 |
| KR | 10-1957707 | 3/2019 |
| KR | 10-2019-0036751 | 4/2019 |
| KR | 10-1969518 | 4/2019 |
| KR | 10-2019-0072996 | 6/2019 |
| KR | 10-2019-0076678 | 7/2019 |
| RU | 2656452 C2 * | 6/2018 |
| WO | 2010-056322 | 5/2010 |

OTHER PUBLICATIONS

Al-Jawad, J., et al. Understanding the spatial variation in lithium concentration of high Andean Salars using diagnostic factors. Science of the Total Environment 906 (2024) 167647. (Year: 2024).*
KIPO, PCT Search Report & Written Opinion of PCT/KR2020/018660 dated Apr. 6, 2021.

* cited by examiner

METHOD OF EXTRACTING LITHIUM FROM LITHIUM-CONTAINING SOLUTION

CROSS-REFERENCE TO RELATED APPLICATION

This application claims priority to and the benefit of Korean Patent Application No. 10-2019-0172463 filed in the Korean Intellectual Property Office on Dec. 20, 2019, the entire contents of which are incorporated herein by reference.

BACKGROUND OF THE INVENTION

(a) Field of the Invention

The present invention relates to a method for extracting lithium from a lithium-containing solution. More specifically, it relates to a method of effectively extracting lithium from a lithium-containing solution.

(b) Description of the Related Art

There are two types of conventional technologies for extracting lithium from brine and a lithium-containing solution. The first type of technology is a method of forming lithium in a solution into lithium carbonate through a chemical treatment, and the second type of technology is a method of extracting the lithium in the solution into lithium phosphate. Both of the methods are used to change lithium ions present in a small amount in the solution into a solid precipitate and thus to change lithium into a material with low solubility, which are called a carbonation process of using sodium carbonate ($Na_2CO_3$) and a phosphorylation process of using phosphoric acid ($H_3PO_4$). In these conventional methods, a chemical reaction is initiated after adjusting pH of the brine and the lithium-containing solution to alkali (in general, pH>10), and during this process, sodium hydroxide (NaOH) is used as an alkalinization ($OH^-$) source. Closely looking at these conventional methods, the carbonation and the phosphorylation are intended to fix the lithium ions in the solution, and in addition, to remove existing impurities (mainly Na ions) and Na components (impurities) resulting from sodium carbonate added to implement the alkalinization. Since lithium carbonate and lithium phosphate have very low solubility in water, a process of washing the lithium carbonate and lithium hydroxide, which are solid/liquid-separated after the reaction is complete, with water to remove Na, the main impurity, is used.

Both of these conventional arts use chemicals, wherein the lithium hydroxide and phosphoric acid bring about serious environmental problems during the discharge and thus are very strictly managed, and particularly, phosphorus (P) is an environmental substance of which a discharge limit is less than or equal to 3 ppm. In the case of using chemicals that cause such environmental problems, the management and treatment costs of a filtrate generated in the mass production process may have a very large impact on the process, and when the process is operated for many years, environmental costs and process management costs may be greatly increased.

Particularly, since the salt lake areas of Argentina and Chile are located at an altitude of 4000 m or higher and are severely restricted as environmental preservation areas, there may be problems of transporting and managing a large amount of chemicals by land for large-scale lithium extraction. Accordingly, logistics, management costs, and by-product disposal costs may not only be increased, but environmental pollution may also be caused by minor accidents, which are expected as problems when the conventional methods are applied.

SUMMARY OF THE INVENTION

The present invention provides a method of extracting lithium from a lithium-containing solution. More specifically, it provides a method of effectively extracting lithium from a lithium-containing solution.

A method of extracting lithium from a lithium-containing solution according to an embodiment of the present invention includes: obtaining a lithium chloride solution from the lithium-containing solution; and crystallizing and removing sodium chloride in the obtained lithium chloride solution.

The crystallizing and removing of the sodium chloride in the obtained lithium chloride solution may be crystallizing sodium chloride using vacuum evaporation crystallization.

The water generated in the crystallizing and removing of the sodium chloride in the obtained lithium chloride solution may be reused in the obtaining of the lithium chloride solution from the lithium-containing solution.

The crystallizing and removing of the sodium chloride in the obtained lithium chloride solution may be performed by heating the solution at 55° C. to 70° C.

In the crystallizing and removing of the sodium chloride in the obtained lithium chloride solution, a concentration of the crystallized sodium chloride may be 45 g/L to 65 g/L. More specifically, sodium chloride is removed by precipitation through crystallization, and in this case, a lithium concentration of the lithium chloride solution in a crystallizer in which sodium chloride is precipitated may be 45 g/L to 65 g/L.

The obtaining of the lithium chloride solution from the lithium-containing solution may be obtaining a lithium chloride solution from the lithium-containing solution using a lithium adsorbent.

The obtaining of the lithium chloride solution from the lithium-containing solution using the lithium adsorbent may include: adsorbing lithium from the lithium-containing solution using a lithium adsorbent; and desorbing the lithium adsorbed on the lithium adsorbent to obtain a lithium chloride solution.

After the obtaining of the lithium chloride solution from the lithium containing solution, the method may further include concentrating lithium using reverse osmosis of the obtained lithium chloride solution.

After the obtaining of the lithium chloride solution from the lithium containing solution, the method may further include concentrating the lithium chloride solution obtained by using electrodialysis.

After the crystallizing and removing of the sodium chloride in the obtained lithium chloride solution, the method may further include performing bipolar electrodialysis of the lithium chloride solution from which sodium chloride has been removed, to obtain lithium hydroxide.

After the performing bipolar electrodialysis of the lithium chloride solution from which sodium chloride has been removed, to obtain lithium hydroxide, the method may further include carbonating the obtained lithium hydroxide to obtain lithium carbonate.

After the performing bipolar electrodialysis of the lithium chloride solution from which sodium chloride has been removed, to obtain lithium hydroxide, the method may further include crystallizing the obtained lithium hydroxide to obtain a solid lithium hydroxide monohydrate.

After the obtaining of the lithium chloride solution from the lithium containing solution, the method may further include crystallizing the obtained lithium chloride solution to obtain a solid lithium chloride.

A method of extracting lithium from a lithium-containing solution according to an exemplary embodiment of the present invention may effectively extract lithium from brine or the lithium-containing solution. The method may secure process stability and reduce a cost and also solve environmental issues by minimizing the use of the conventional chemicals used for carbonation and phosphorylation and not using phosphoric acid, a main environmental influence material, during the process.

The method of extracting lithium from a lithium-containing solution according to an exemplary embodiment of the present invention may be widely applied to a solution including lithium and have excellent process expandability and applicability in various fields in the future, and particularly, in a lithium battery recycling field.

The method of extracting lithium from a lithium-containing solution according to an exemplary embodiment of the present invention may return the entire amount of water obtained from reverse osmosis (RO), electrodialysis (ED), and a crystallizer into the duration of the process and use it, so that the water may be used as desorption water in the adsorption process, and thus reduce the amount of water used in the process. Because of these advantages, the method may have an effect of reducing the amount of fresh water by 80%, compared with a process of applying a conventional adsorbent, and resultantly, increase the utilization of salt lakes located at a high altitude.

DETAILED DESCRIPTION OF THE EMBODIMENTS

Figure 1:
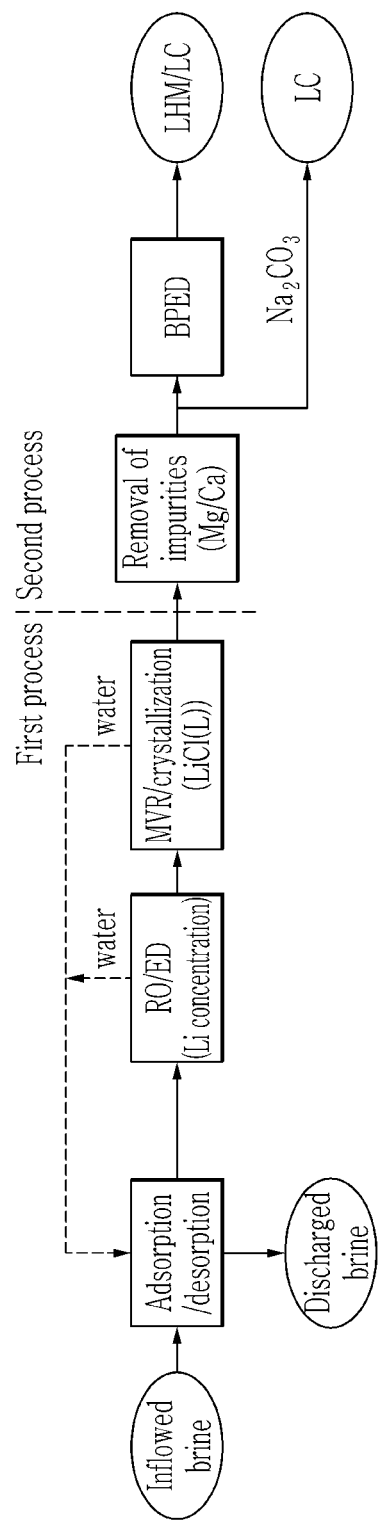
FIG. 1 is a process diagram according to an embodiment of the present invention.

In the present specification, although terms such as first, second, and third are used for describing various parts, components, areas, and/or sections, the present invention is not limited thereto. Such terms are used only to distinguish any part, component, area, layer, or section from the other parts, components, areas, layers, or sections. Thus, a first part, a first component, a first area, a first layer, or a first section which is described below may be mentioned as a second part, a second component, a second area, a second layer, or a second section without departing from the scope of the present invention.

In the present specification, unless explicitly described to the contrary, the word "comprise" and variations such as "comprises" or "comprising" will be understood to imply the inclusion of stated elements but not the exclusion of any other elements.

Terminologies used herein are merely used to describe a specific embodiment, and are not intended to limit the present invention. A singular form used herein includes a plural form as long as a phrase does not express a clearly opposite meaning. In the specification, it is to be understood that terms such as "including," "having," etc., are intended to indicate the existence of specific features, regions, numbers, stages, operations, elements, components, or combinations thereof disclosed in the specification, and are not intended to preclude the possibility that one or more other specific features, regions, numbers, operations, elements, components, or combinations thereof may exist or may be added.

In the present specification, the term "combination thereof" included in an expression of a Markush type refers to one or more mixtures or combinations selected from the group consisting of components described in the expression of the Markush type and it means to include at least one selected from the group consisting of the above components.

In the present specification, when a part is referred to as being "on" another part, it can be directly on the other part or intervening parts may also be present. In contrast, when an element is referred to as being "directly on" another element, there are no intervening elements therebetween.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the same meanings as contextual meanings in the relevant field of art, and are not to be interpreted to have idealized or excessively formal meanings unless clearly defined in the present application.

Further, as used herein, "%" means "wt %," unless the context clearly indicates otherwise, and 1 ppm is 0.0001 wt %.

In an embodiment of the present invention, the meaning of further including an additional element means that remaining iron (Fe) is replaced by an additional amount of the additional element.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

A method of extracting lithium from a lithium-containing solution according to an exemplary embodiment of the present invention includes obtaining a lithium chloride solution from the lithium-containing solution, and crystallizing and removing sodium chloride in the obtained lithium chloride solution.

Hereinafter, each process will be described.

First, a lithium chloride solution is obtained from the lithium-containing solution. This process may be obtaining a lithium chloride solution from a lithium-containing solution using a lithium adsorbent. In this case, the lithium-containing solution may be, more specifically, brine.

The obtaining of the lithium chloride solution from the lithium-containing solution using the lithium adsorbent may include adsorbing lithium from the lithium-containing solution using a lithium adsorbent, and desorbing the lithium adsorbed on the lithium adsorbent to obtain a lithium chloride solution.

The lithium-containing solution is passed through the adsorbent, wherein a lithium component in the lithium-containing solution reacts with the adsorbent and is fixed thereto. In this process, other ionic components are discharged together with the brine, and the discharged brine has the same components as the initially-added brine except that lithium alone is reduced therefrom. In other words, since there are no chemical and environmental changes, the brine may be discharged as it is. When the absorbent to which lithium has been absorbed through the process is supplied with fresh water, the lithium is discharged into the fresh water and is thus included in the fresh water. Herein, in general, a concentration of Li should be at the same level as that of the lithium in the lithium-containing solution during the process. Since the concentration of Li in the brine, which is an example of the lithium-containing solution added in this process, is at the level of about 1 g/L, the concentration of Li in the desorption water is also about 1 g/L. The desorption water obtained up to this level includes Li at too a low concentration to be used for the subsequent process, even though Li is separated from impurities such as Na and the like, and thus should be concentrated.

Subsequently, the method may further include concentrating the lithium of the obtained lithium chloride solution through reverse osmosis.

In addition, the method may further include concentrating the lithium of the obtained lithium chloride solution through electrodialysis.

Since the concentration of the impurities has been already lowered through the adsorbent, there is no burden on the reverse osmosis (RO) and the electrodialysis (ED) during the concentration, and accordingly, the reverse osmosis (RO) and the electrodialysis (ED) may work under normal operating conditions. Since the entire amount of the water obtained in this process (non-concentrated side of RO and desalted side of ED) may be returned and reused as fresh water (water recovered during the process is pure water (DI)) used in the former process, the desorption process, and thus contributes to reducing use of process water.

Through this process, the Li solution at 1 g/L may be concentrated to 15 g/L, wherein when brine is used, the composition may be LiCl.

Then, in the obtained lithium chloride solution, the sodium chloride is crystallized and removed.

The crystallizing and removing of the sodium chloride in the obtained lithium chloride solution may be crystallizing sodium chloride using vacuum evaporation crystallization.

The water generated in the crystallizing and removing of the sodium chloride in the obtained lithium chloride solution may be reused in the obtaining of the lithium chloride solution from the lithium-containing solution. More specifically, it may be reused in the obtaining of the lithium chloride solution from the lithium-containing solution using the lithium adsorbent. More specifically, in the obtaining of the lithium chloride solution from the lithium-containing solution using the lithium adsorbent, it may be reused as desorption water.

The crystallizing and removing of the sodium chloride in the obtained lithium chloride solution may be performed by heating the solution to 55° C. to 70° C.

In the crystallizing and removing of the sodium chloride in the obtained lithium chloride solution, a concentration of the crystallized sodium chloride may be 45 g/L to 65 g/L based on the lithium chloride solution. More specifically, the sodium chloride is removed by precipitation through crystallization, and in this case, the lithium concentration of the lithium chloride solution in the crystallizer in which sodium chloride is precipitated may be 45 g/L to 65 g/L. More specifically, it may be 50 g/L. In this process, since the precipitation of LiCl is at the level of 70 g/L based on Li, there is no precipitation of LiCl, but precipitation of sodium chloride may occur under equivalent conditions.

Next, after the crystallizing and removing of the sodium chloride in the obtained lithium chloride solution, the method may further include performing bipolar electrodialysis of the lithium chloride solution from which sodium chloride has been removed, to obtain lithium hydroxide.

Through the above processes, a lithium-concentrated lithium chloride solution may be obtained, and if a Na concentration in the lithium-concentrated lithium chloride solution is less than 1 g/L, it is at a level that does not cause impurity problems in the subsequent processes such as bipolar electrodialysis (BPED), LiOH crystallization, or carbonation.

After the performing bipolar electrodialysis of the lithium chloride solution from which sodium chloride has been removed, to obtain lithium hydroxide, the method may further include carbonating the obtained lithium hydroxide to obtain lithium carbonate.

After the performing bipolar electrodialysis of the lithium chloride solution from which sodium chloride has been removed, to obtain lithium hydroxide, the method may further include crystallizing the obtained lithium hydroxide to obtain a solid lithium hydroxide monohydrate.

After the obtaining the lithium chloride solution from the lithium-containing solution using the lithium adsorbent, the method may further include crystallizing the obtained lithium chloride solution to obtain a solid lithium chloride.

In addition, in the process, the entire amount of water obtained from the reverse osmosis (RO), the electrodialysis (ED), and the NaCl crystallization may be returned to the process and reused as desorption water used in the adsorption process, and accordingly, reduce the water amount required in the process. This process has an effect of reducing the amount of fresh water by 80%, compared with a process of applying the conventional adsorbent, and thus may improve the usability of salt lake areas at a high altitude.

Figure 2:
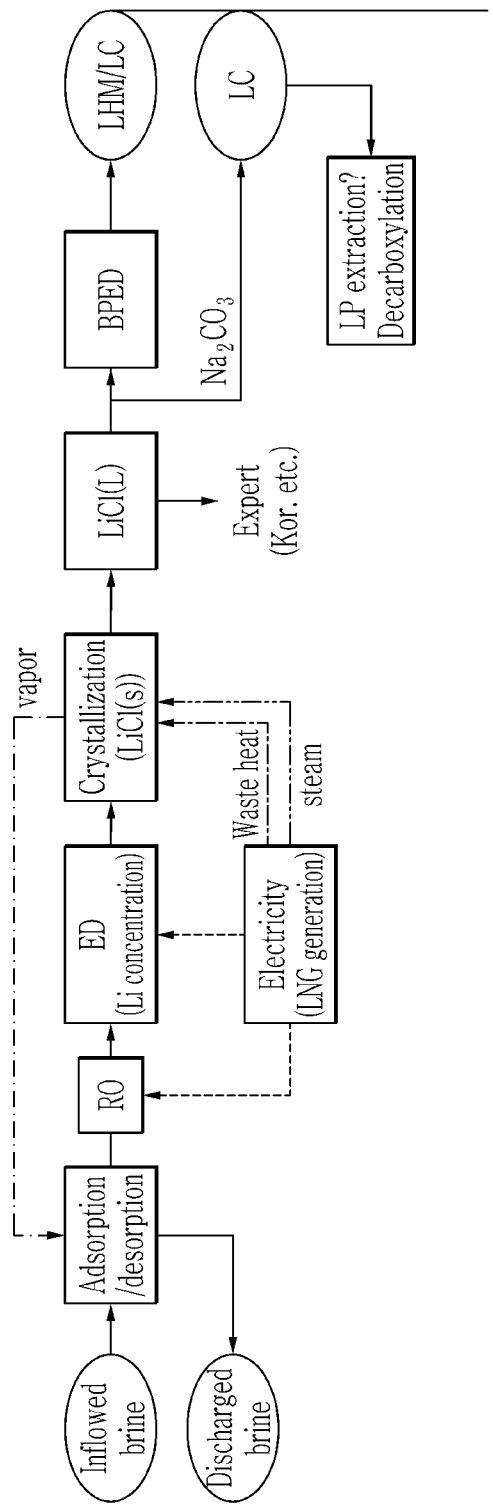
FIG. 2 is a detailed process diagram according to an embodiment of the present invention.

FIG. 1 illustrates a process according to an embodiment of the present invention. In addition, FIG. 2 shows a detailed process according to an embodiment of the present invention.

The present invention will now be described in detail through examples. The examples exemplify the present invention, and the present invention is not limited thereto.

Example (1) Preparation of Lithium-Containing Solution

First, a lithium-containing solution having a similar composition to that of natural brine was prepared. Table 1 shows a concentration of each component in the lithium-containing solution. Herein, each component concentration uses a unit of g/L. In addition, in the last row of Table 1, pH of the brine is provided.

TABLE 1

|  | Li | S | Ca | Mg | K | B | Na | pH |
|---|---|---|---|---|---|---|---|---|
| g/L | 1.24 | 4.92 | 0.453 | 3.23 | 12.61 | 0.620 | 106.34 | 6.7 |

(2) Adsorption and Desorption of Lithium-Containing Solution

The prepared lithium-containing solution was absorbed by using a lithium adsorbent. Herein, the used lithium adsorbent was LiCl·2Al(OH)$_2$·nH$_2$O. However, in an exemplary embodiment of the present invention, the type of the lithium adsorbent was not limited thereto. Table 2 shows a composition of the lithium-containing solution discharged after the absorption of the lithium-containing solution. Herein, the concentration of each component uses a unit of g/L. In addition, in the last row of Table 2, a lithium adsorption rate (%) is provided.

As shown in Table 2, when the original lithium-containing solution included 1.24 g/L of lithium, the lithium component was decreased down to the range of 0.042 g/L to 0.058 g/L through the adsorption process. Accordingly, most of lithium was absorbed in the lithium adsorbent. An adsorption rate of actually-obtained lithium was in the range of 95.3% to 96.6%.

TABLE 2

|   | Li | S | Ca | Mg | K | B | Na | Lithium adsorption rate (%) |
|---|----|----|------|------|--------|-------|--------|------|
| 1 | 0.058 | 4.51 | 0.370 | 2.75 | 11.302 | 0.379 | 95.613 | 95.3 |
| 2 | 0.042 | 4.46 | 0.364 | 2.70 | 11.236 | 0.370 | 95.672 | 96.6 |

Subsequently, the lithium-absorbed lithium adsorbent was supplied with fresh water to extract lithium and obtain desorption water. Table 3 shows a composition of the desorption water obtained after desorption. Herein, the concentration of each component uses a unit of g/L.

As shown in Table 3, Li was obtained at a concentration of 1.27 g/L, which was equal to 1.24 g/L of the initially-added brine, and Na, a main impurity, was mostly removed from 106 g/L to 0.24 g/L. In addition, when there were impurities such as Ca and Mg, Ca was mostly removed from 0.453 g/L to 0.012 g/L, and Mg also was mostly removed from 3.23 g/L to 0.063 g/L.

TABLE 3

|     | Li | S | Ca | Mg | K | B | Na |
|-----|----|----|------|------|-------|-------|-------|
| g/L | 1.27 | 0.007 | 0.012 | 0.063 | 0.026 | 0.197 | 0.244 |

(3) Reverse Osmosis and Electrodialysis

The above desorption water was concentrated by using reverse osmosis (RO) and electrodialysis (ED).

(4) NaCl Crystallization

In the lithium chloride solution concentrated by using RO and ED, Na was crystallized into NaCl with a solid-phase through a crystallizer. Herein, the crystallizer was a vacuum evaporative crystallizer, and a heating temperature was in the range of 55° C. to 70° C.

Table 4 shows a composition of a lithium chloride solution concentrated through the reverse osmosis and electrodialysis in the step (3) and a composition of the solution after the NaCl crystallization in the step (4). Herein, the concentration unit is g/L.

As an analysis result of Table 4, Li was concentrated down to 52.76 g/L after the step (4) compared with 12.12 g/L after the step (3), but Na was maintained at almost the same level of 6.60 g/L after the step (4) compared with 5.60 g/L after the step (3). This is because Na concentrated at the same rate during the concentration process was mostly precipitated into NaCl during the crystallization process and thus removed as a solid phase.

Resultantly, the obtained NaCl was a harmless salt and thus might be discharged with no problem into salt lake areas, etc.

TABLE 4

|  | Li | S | Ca | Mg | K | B | Na | Volume of solution (mL) | pH |
|---|----|----|----|----|----|----|----|----|----|
| Weight (g) after step (3) | 6.181 | 0.004 | 0.027 | 0.029 | 0.421 | 0.051 | 2.856 | 510 | — |
| Concentration (g/L) after step (3) | 12.12 | 0.007 | 0.052 | 0.057 | 0.826 | 0.100 | 5.60 | 510 | 1.87 |
| Weight (g) after step (4) | 5.909 | 0.003 | 0.023 | 0.024 | 0.339 | 0.048 | 0.739 | 112 | — |
| Concentration (g/L) after step (4) | 52.76 | 0.030 | 0.202 | 0.210 | 3.03 | 0.425 | 6.60 | 112 | −2 |

Referring to the above results, the obtained final LiCl solution was in a highly concentrated state and thus might cause a very small logistics burden during transportation. After transporting this concentrated LiCl solution, BPED was used to prepare a LiOH solution, and then, to prepare lithium hydroxide monohydrate and lithium carbonate. Herein, the transported LiCl solution at a high concentration was not added to BPED as it is but was diluted to an applicable level in a BPED process, and a Li concentration of the LiCl solution for the BPED process may be in the range of 10 g/L to 13 g/L. Assuming that the LiCl solution was diluted, when the LiCl solution was diluted from 52 g/L to 12 g/L on average based on Li, Na reached a concentration of 1.53 g/L, and accordingly, lithium hydroxide monohydrate and lithium carbonate with high purity of a battery grade might be obtained in the operation of BPED and the subsequent crystallization and carbonation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A method of extracting lithium from a lithium-containing solution, comprising:
   obtaining a lithium chloride solution from the lithium-containing solution;

crystallizing and removing sodium chloride in the obtained lithium chloride solution; and crystallizing the obtained lithium chloride solution to obtain a solid lithium chloride, wherein the crystallizing and removing of the sodium chloride in the obtained lithium chloride solution is performed by heating the solution at 55° C. to 70° C.

2. The method of claim 1, wherein the crystallizing and removing of the sodium chloride in the obtained lithium chloride solution is crystallizing sodium chloride using vacuum evaporation crystallization.

3. The method of claim 2, wherein water generated in the crystallizing and removing of the sodium chloride in the obtained lithium chloride solution is reused in the obtaining of the lithium chloride solution from the lithium-containing solution.

4. The method of claim 1, wherein
in the crystallizing and removing of the sodium chloride in the obtained lithium chloride solution,
a lithium concentration of the lithium chloride solution in which sodium chloride is precipitated is 45 g/L to 65 g/L.

5. The method of claim 1, wherein
the obtaining a lithium chloride solution from the lithium-containing solution is
obtaining a lithium chloride solution from the lithium-containing solution using a lithium adsorbent.

6. The method of claim 5, wherein
the obtaining the lithium chloride solution from the lithium-containing solution using the lithium adsorbent comprises:
adsorbing lithium from the lithium-containing solution using a lithium adsorbent; and
desorbing the lithium adsorbed on the lithium adsorbent to obtain a lithium chloride solution.

7. The method of claim 1, wherein
after the obtaining of the lithium chloride solution from the lithium containing solution,
the method further comprises concentrating lithium using reverse osmosis of the obtained lithium chloride solution.

8. The method of claim 1, wherein
after the obtaining of the lithium chloride solution from the lithium containing solution,
the method further comprises concentrating the lithium chloride solution obtained by using electrodialysis.

9. The method of claim 1, wherein
after the crystallizing and removing of the sodium chloride in the obtained lithium chloride solution,
the method further comprises performing bipolar electrodialysis of the lithium chloride solution from which sodium chloride has been removed, to obtain lithium hydroxide.

10. The method of claim 9, wherein
after the performing bipolar electrodialysis of the lithium chloride solution from which sodium chloride has been removed, to obtain lithium hydroxide,
the method further comprises carbonating the obtained lithium hydroxide to obtain lithium carbonate.

11. The method of claim 9, wherein
after the performing bipolar electrodialysis of the lithium chloride solution from which sodium chloride has been removed, to obtain lithium hydroxide,
the method further comprises crystallizing the obtained lithium hydroxide to obtain a solid lithium hydroxide monohydrate.

* * * * *